US008291159B2

(12) United States Patent
Rajagopal et al.

(10) Patent No.: US 8,291,159 B2
(45) Date of Patent: Oct. 16, 2012

(54) MONITORING AND UPDATING MAPPING OF PHYSICAL STORAGE ALLOCATION OF VIRTUAL MACHINE WITHOUT CHANGING IDENTIFIER OF THE STORAGE VOLUME ASSIGNED TO VIRTUAL MACHINE

(75) Inventors: Haripriya Rajagopal, Sunnyvale, CA (US); Jayant Kulkarni, Pune (IN); Komal Desai, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 705 days.

(21) Appl. No.: 12/402,843

(22) Filed: Mar. 12, 2009

(65) Prior Publication Data

US 2010/0235832 A1 Sep. 16, 2010

(51) Int. Cl.
*G06F 9/455* (2006.01)
*G06F 9/46* (2006.01)
*G06F 15/173* (2006.01)
*G06F 12/00* (2006.01)

(52) U.S. Cl. ............ 711/111; 711/112; 709/226; 718/1; 718/104

(58) Field of Classification Search ......................... None
See application file for complete search history.

(56) References Cited

U.S. PATENT DOCUMENTS

| | | | | |
|---|---|---|---|---|
| 7,263,593 | B2 * | 8/2007 | Honda et al. | 711/205 |
| 7,266,637 | B1 * | 9/2007 | van Rietschote | 711/112 |
| 7,784,049 | B1 * | 8/2010 | Gandler | 718/1 |
| 7,801,994 | B2 * | 9/2010 | Kudo | 709/226 |
| 2005/0193167 | A1 * | 9/2005 | Eguchi et al. | 711/114 |
| 2006/0075199 | A1 * | 4/2006 | Kallahalla et al. | 711/153 |
| 2006/0248047 | A1 * | 11/2006 | Grier et al. | 707/2 |
| 2007/0245116 | A1 * | 10/2007 | Yamamoto et al. | 711/172 |
| 2008/0028143 | A1 * | 1/2008 | Murase | 711/114 |
| 2008/0155223 | A1 * | 6/2008 | Hiltgen et al. | 711/173 |
| 2008/0235448 | A1 * | 9/2008 | Inoue et al. | 711/114 |
| 2008/0250222 | A1 * | 10/2008 | Gokhale et al. | 711/203 |
| 2010/0070725 | A1 * | 3/2010 | Prahlad et al. | 711/162 |
| 2010/0100878 | A1 * | 4/2010 | Otani | 718/1 |
| 2011/0061049 | A1 * | 3/2011 | Kobayashi et al. | 718/1 |

OTHER PUBLICATIONS

White paper by HP, 2008. "Storage virtualization and the HP StorageWorks Enterprise Virtual Array", 13 pages, http://h71028.www7.hp.com/ERC/downloads/4AA1-8130ENW.pdf.
Taken from Wikipedia, the free encyclopedia, "Storage virtualization", 10 pages, http://en.wikipedia.org/w/index.php?title=Storage_virtualization&oldid=275409820.

* cited by examiner

*Primary Examiner* — Meng An
*Assistant Examiner* — Abdullah Al Kawsar

(57) ABSTRACT

Computer implemented methods and systems for providing storage virtualization of physical storage include receiving a request for storage from a virtual machine during provisioning of the virtual machine. The request includes a capability and quota requirement for storage as required by the virtual machine. A virtual datastore that satisfies the capability and quota requirements of the request is identified. If not found, one or more volumes, that satisfy the storage requirements, are discovered or created. A virtual datastore is created and maps to one or more volumes which have unique volume identifiers. A unique virtual datastore identifier is generated for the virtual datastore. The virtual datastore identifier is distinct from the volume identifiers of the underlying volumes. The volumes are mapped to the virtual datastore while retaining the virtual datastore identifier for the virtual datastore. The virtual datastore identifier for the virtual datastore is not changed when modifications are made to the physical storage entities mapped to the virtual datastore.

26 Claims, 7 Drawing Sheets

MONITORING AND UPDATING MAPPING OF PHYSICAL STORAGE ALLOCATION OF VIRTUAL MACHINE WITHOUT CHANGING IDENTIFIER OF THE STORAGE VOLUME ASSIGNED TO VIRTUAL MACHINE

BACKGROUND

1. Field of the Invention

The present invention relates to providing storage resources for a virtual machine, and more particularly, to introducing an abstraction layer for physical storage and providing a virtualized storage to the virtual machine based on storage requirements of the virtual machine.

2. Description of the Related Art

The computing industry has seen many advances in recent years including advances related to virtualization of computing systems. Virtualization allows a computing system to perform the job of multiple computing systems by abstracting computer resources such as hardware, and sharing these resources across multiple environments. This includes hosting multiple operating systems and multiple applications that are available locally or at remote locations. Virtualization enables more efficient utilization and leveraging of hardware, high availability of computer resources, better resource management, increased security and improved disaster recovery process when a virtual infrastructure is built.

In virtualization, almost every entity uses some level of indirection to simplify computing and resource management. For instance, virtual machines are an abstraction of physical hosts, distributed virtual switches are an abstraction of networks, etc. Virtual machines are fundamental building blocks of a virtual infrastructure and represent hardware resources of a computer while the virtual infrastructure (VI) represents interconnected hardware resources of an organization including computers, network devices and storages.

In a VI platform, shared storage is presented to virtual machines through logical containers called datastores. However, the available datastores at the VI are vendor specific or file-system specific, are tightly coupled to the underlying physical volume, are of fixed capacity and take on the underlying volume's identity. Thus, there is a one-to-one relationship between the volume and the datastore. As a result, provisioning and managing such datastores for a virtual machine by a VI administrator results in the VI administrator having to learn the intricacies of managing these volumes which is, ideally, a physical storage administrator's job.

Consequently, the virtual machines associated with these datastores are also tied to the underlying physical storage providing a static environment. Any changes to the underlying volume's identity due to resignaturing, retiring, failure, etc., will require the virtual machines to unregister from the host resulting in considerable downtime of the virtual machines while a new volume is identified and assigned. If a volume needs to be retired, then all the data in the volume has to be moved to a new volume and all references to the volume has to be updated to reflect the new volume. Such updates are either done manually or by running a program script. The program script or manual updates need to ensure that any policies associated with resource allocation of the virtual machines are not violated. Special care has to be taken to ensure that the maintenance and provisioning of the physical storage does not disrupt or, otherwise, severely affect the virtual infrastructure management.

It is in this context that embodiments of the invention arise.

SUMMARY

Embodiments of the present invention provide computer implemented methods and systems for providing storage virtualization of physical storage. One or more physical storage entities, each with specific capability and quota, are used to create a virtual datastore by first creating a physical volume internally with a unique volume identifier using the one or more physical storage entities and the volume is then abstracted into a virtual datastore. A virtual datastore identifier is generated to uniquely identify the virtual datastore. The virtual datastore identifier is distinct from the identifiers of the physical storage entities that make up the virtual datastore and the underlying volume. The physical storage entities associated with the virtual datastore are mapped to the virtual datastore using the virtual datastore identifier while retaining the virtual datastore identifier for the virtual datastore. The virtual datastore has the combined capability and quota of the underlying physical storage entities. A structural and functional integrity is preserved for the physical storage entities contained within and access to the physical storage entities is enabled by referencing the virtual datastore identifier.

Using this feature, a level of virtualization can be achieved such that a virtual infrastructure administrator does not have to understand the intricacies of storage management in order to maintain the virtual datastore. Metadata of physical storage entities are mapped to the virtual datastore using the virtual datastore identifier. Since the underlying physical storage entities are kept distinct and mapped to the virtual datastore (VDS), any changes to the underlying physical storage entities are handled independent of the VDS and are transparent at the VDS level thereby shielding a VI administrator from the intricacies of the underlying physical storage management. The updated physical storage entities continue to be mapped to the same VDS identifier thereby preserving reference information to the VDS even when underlying physical storage entities have changed.

It should be appreciated that the present invention can be implemented in numerous ways, such as a process, an apparatus, a system, a device or a method on a computer readable medium. Several inventive embodiments of the present invention are described below.

In one embodiment, a computer implemented method for providing storage virtualization of physical storage is provided. The method includes identifying one or more physical storage entities and generating one or more volumes using the physical storage entities. Each volume has specific capability and quota that is reflective of the combined capabilities and quota of the underlying storage entities. The volumes are all identified using corresponding unique volume identifiers. A virtual datastore for the one or more volumes is defined. A unique virtual datastore identifier is defined for the virtual datastore that is distinct from any of the one or more unique volume identifiers of the corresponding volumes that make up the virtual datastore and the volumes are mapped to the virtual datastore while retaining the virtual datastore identifier for the virtual datastore. The virtual datastore identifier for the virtual datastore is not changed when modifications are made to the volumes mapped to the virtual datastore. The mapping enables using the unique virtual datastore identifier to reference the volumes and the corresponding one or more physical storage entities that make up the respective volumes.

In an alternate embodiment, a computer implemented method for providing storage virtualization of physical storage is disclosed. The method includes receiving a request for storage from a virtual machine during the provisioning of the virtual machine. The request is analyzed to determine a set of capabilities and quota requirements for storage that is required by the virtual machine. A virtual datastore that satisfies the capability and quota requirements of the request is identified. The virtual datastore includes a part or one or more volumes with unique volume identifiers. If a VM is not using an existing VDS, a unique virtual datastore identifier that is different from any of the underlying volumes identifiers, is generated for the identified virtual datastore. The volumes are mapped to the virtual datastore while retaining the virtual datastore identifier for the virtual datastore. The virtual datastore identifier for the virtual datastore is not changed when modifications are made to the volumes mapped to the virtual datastore.

In another embodiment of the invention, a system for providing storage virtualization of physical storage is disclosed. The system includes a server computer for receiving a request for storage during provisioning of a virtual machine. The server computer is equipped with a plurality of components to service the request. The plurality of components include a virtual machine (vm) creator to create a virtual machine on a host server for executing one or more applications on the host. The vm creator defines a set of capabilities and quota requirements of storage required by the vm in order to execute the one or more applications. A request for storage is generated by the vm creator. The system further includes a provisioning module with programming logic to receive the request, analyze the request to identify the storage requirements and to validate the request. A mapper module with in the system includes programming logic to identify one or more physical storage entities that satisfy the storage requirements of the request; generate a virtual datastore with the identified physical storage entities by internally creating a volume with unique volume identifier and associating the volume to the virtual datastore. The mapper module further creates a unique virtual datastore identifier for the virtual datastore that is different from any of the identifiers associated with the selected one or more volumes and the identified physical storage entities and maps the selected ones of volumes to the virtual datastore while retaining the virtual datastore identifier for the virtual datastore. The virtual datastore identifier for the virtual datastore is not changed when modifications are made to the volumes mapped to the virtual datastore. The request for storage may be received by the server computer during provisioning of the virtual machine.

BRIEF DESCRIPTION OF THE DRAWINGS

The invention may best be understood by reference to the following description taken in conjunction with the accompanying drawings.

DETAILED DESCRIPTION

Figure 1:
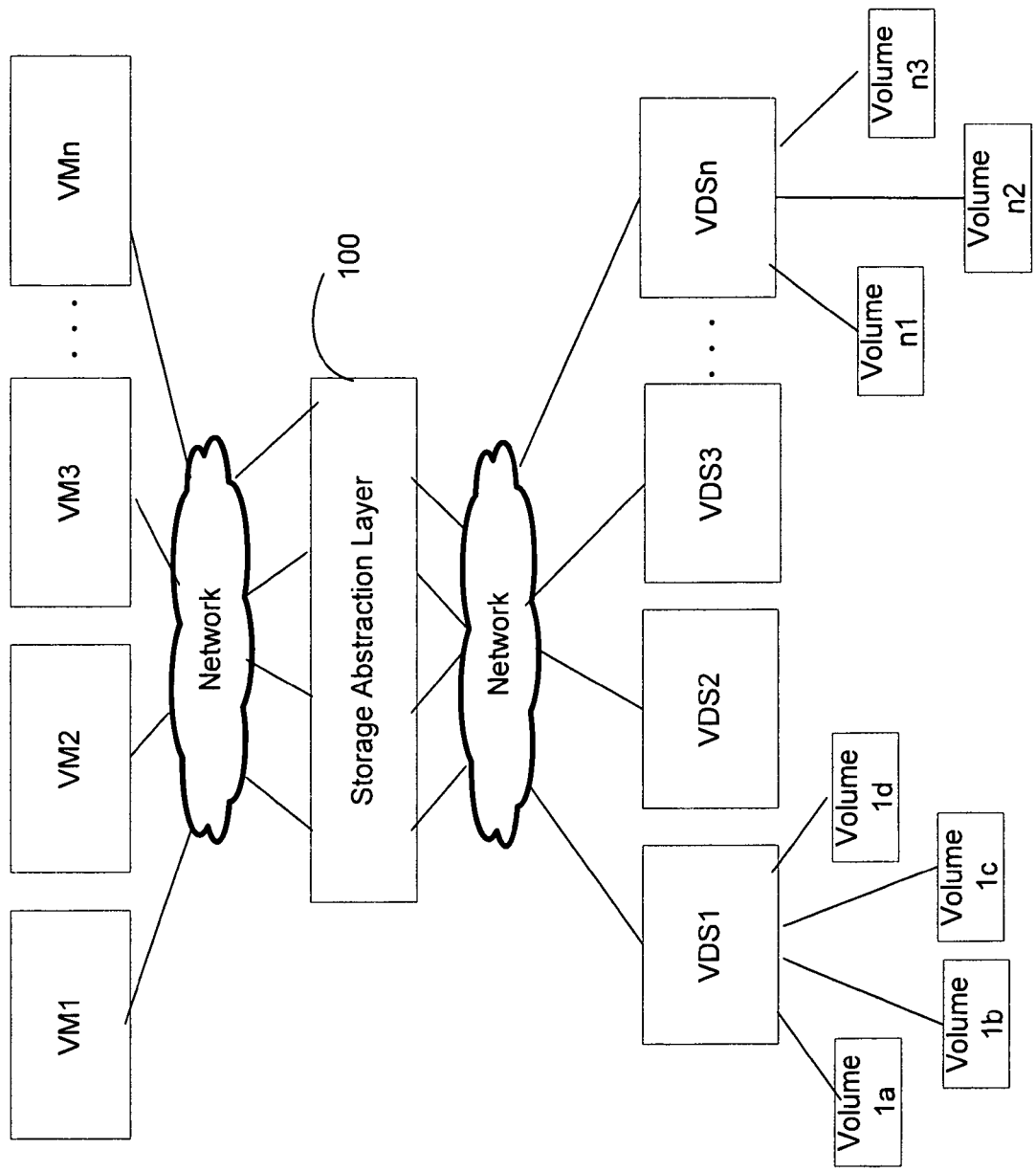
FIG. 1 illustrates an overview of a storage abstraction layer that is used to virtualize physical storage, in accordance with one embodiment of the present invention.

Broadly speaking, the embodiments of the present invention provide methods and computer implemented systems that enable virtualization of physical storage when provisioning storage to a virtual machine. The methods preserve the structural integrity and functionality of the physical storage while providing true virtualization for the storage. In one embodiment, computer implemented methods are provided to enable the discovery of one or more volumes of storage with specific capabilities and quota. Each of the volumes include one or more physical storage entities. The volumes are grouped together into a virtual datastore. A unique virtual datastore identifier is generated for the virtual datastore and the underlying volumes are mapped to the virtual datastore using the unique virtual datastore identifier so that the underlying volumes can be referenced using the virtual datastore identifier.

The term "virtual datastore (VDS)" as used herein means a virtual storage entity, which is created on top of one or more physical storage entities (e.g., disks, volumes, LUNs, etc.) or storage services. A VDS has its own set of configurable properties as for example capabilities, quota, permission model, etc., independent of the underlying hardware and physical storage entities. In one embodiment, the term "capabilities" corresponds to features such as replication, thin provisioning, high availability, etc. These capabilities can be obtained from physical entities or storage services Virtual machines are mapped to physical storage through a datastore. A physical storage that satisfied the storage requirements of a virtual machine is identified and a logical volume is created with a unique volume identifier, for the physical storage. The logical volume, so created, is vendor specific or file-system specific. The volume is abstracted into a datastore and assigned the corresponding volume's identifier. The datastore is then presented to the virtual machine as virtualized storage. However, the datastore is still tied to the same physical storage through the logical volume. If the underlying volume changes, then the datastore also changes and reference to the datastore which has taken the volume's identifier also needs to change. This compromises the virtual infrastructure. In order to preserve the integrity of the system, any and all references to the datastore will have to change throughout the system, which is very cumbersome, time-consuming, and error prone.

Creating an abstraction layer between the physical storage and virtual storage by breaking the tight coupling between physical storage and virtual storage, enables the physical storage entities and, hence, distribution of storage capacity to become transparent to servers and applications. Further, the complexity of physical distribution is masked, making management of physical storage simple and straightforward. In accordance with one embodiment, by defining capacity and adding capabilities, the virtual datastore's properties may be defined in a vendor-agnostic and file-system agnostic manner.

The virtualization also enables vendor-agnostic non-disruptive data migration. As the physical storage is isolated from the virtual machines due to the virtualization which introduces an abstraction layer, data can be migrated without any downtime to the virtual machines (VMs). After moving the data, metadata associated with the data is dynamically updated to point to the new location and the VMs are shielded from such backend changes. Additionally, the virtual storage can have any logical capacity and is not restricted to the physical capacity of the underlying volume. In such cases, the virtual storage behaves like a storage pool wherein the capacity of the virtual storage can be dynamically expanded or restricted as needed. If the underlying storage behaves like a storage pool, the physical storage administrator can assign new physical storage entities, such as physical logical unit numbers (LUNs), local disks and volumes, as needed enabling the provisioned storage space to exceed the available storage limitation of physical storage entities.

The virtualization also provides for a clear delineation of a physical storage administrator's and a virtual infrastructure (VI) administrator's roles thereby enabling ease of maintenance and management. The VI administrator is shielded from the intricacies and overhead associated with physical storage management including any changes, such as resignaturing, retiring, failure, moving, etc., that would otherwise affect the VI environment. As long as the VMs are able to access the data in the physical storage, physical storage entities in the physical storage layer can change independently anytime without adversely affecting the VMs. A policy management module ensures that a Quality of Service (QoS) is maintained by allowing defining of vendor-agnostic capabilities for the virtual datastore and enabling VMs to utilize these capabilities to the fullest through storage virtualization. Datastore migration is eased by allowing virtual datastore to move to a different host while physical data is moved to a different backing that is different from the current physical storage but having the same capabilities as the current physical storage. Additional benefits can be realized based on the following detailed description.

With the above overview in mind, the following description provides numerous specific details set forth in order to provide a thorough understanding of the present invention. It will be apparent, however, to one skilled in the art that the present invention may be practiced without some or all of these specific details. Operations may be done in different orders, and in other instances, well known process operations have not been described in detail in order not to unnecessarily obscure the present invention. Several exemplary embodiments of the invention will now be described in detail with reference to the accompanying drawings.

FIG. 1 illustrates an overview of an abstraction layer that provides virtualization of physical storage, in one embodiment of the invention. As illustrated, a plurality of virtual machines (VMs, such as VM1, VM2, VM3, . . . VMn) are registered on one or more hosts running applications. The VMs require storage for running the applications on the host. A storage abstraction layer with an abstraction layer algorithm 100 is provided to the VMs over the network so that the VMs can request and receive storage for running applications on the respective hosts. The abstraction layer algorithm 100 includes logic to analyze the storage requirements of the respective VMs in order to identify a set of capabilities and quota required for storage by the VMs. Capabilities, as used in this application, include a large number of attributes that together describe storage requirements of a VM. Some of the attributes may include data mirroring, frequency of data backup, storage vendor type, etc., that are associated with storage or provided by other services. The abstraction layer algorithm or abstraction algorithm 100 then traverses a storage farm over the network to identify one or more physical storage entities or services that satisfy the requirements of a particular VM and generates a virtual datastore (VDS) for each of the VM using the identified storage entities.

The abstraction algorithm 100 first creates one or more volumes internally, such as Volumes 1a, 1b, 1c, 1d, n1, n2, n3, etc., with the identified one or more physical storage entities. The volumes so created are logical representations of the physical storage entities. As can be seen, more than one volume can be created for a VDS. In one embodiment, the abstraction algorithm 100 generates a volume, volume 1a, with the identified physical storage entities that satisfy the capability and quota requirements of a VM, such as VM2, at a given time. To begin with, a virtual datastore, VDS1, is generated using volume 1a. Subsequently, the algorithm may detect additional storage requirements for VM2 and goes down to the storage farm over the network to discover one or more additional physical storage entities that satisfy the latest additional storage quota requirements of VM2. The VDS is not restricted to capacity or quota limitation of one or more physical storage entities but can have any logical capacity and is expandable. Thus, VDS may increase the corresponding quota requirements to accommodate the changing needs of VM2. As a result, a second volume (Volume 1b) is created for VM2 with the identified additional physical storage entities that satisfy the expanded storage requirements of VM2. The newly created volume, Volume 1b, is also associated with the same VDS, VDS1, that is mapped to VM2. At this time, the VDS1 includes two volumes that together satisfy the capability and quota requirements of VM2. As the requirements of VM2 keep changing, the algorithm may allow for expansion or restriction of storage within the VDS1. Currently, in the embodiment illustrated in FIG. 1, VDS1 is currently associated with volumes 1a, 1b, 1c and 1d. Similarly, VDSn is associated with volumes n1, n2, and n3, respectively.

It should be noted that a VDS may include a part of a volume, a single volume or a plurality of volumes. In one embodiment, a single volume may be associated with two different virtual datastores. For instance, part of a volume may satisfy the capability and quota requirements of a VDS and the remaining part of the same volume may satisfy the capability and quota requirements of a second VDS. In this case, a single volume is shared between the first and the second VDS.

The abstraction algorithm 100 then creates a unique virtual datastore identifier, in the form of universal unique identifier (uuid), for each of the virtual datastores associated with the VMs. The virtual datastore identifiers of the virtual datastores are independent of and distinct from any of the identifiers associated with the one or more volumes that make up the virtual datastores. The one or more volumes that make up the virtual datastore are mapped to the virtual datastore while retaining the virtual datastore identifier for the virtual datastore. The virtual datastore identifier does not change for the virtual datastore even when the changes are made to the volumes that are mapped to the virtual datastore. The mapping enables referencing the corresponding volumes and the underlying physical storage entities using the virtual datastore identifier, thus providing true virtualization for storage. This virtualization enables a VI administrator to manage only the virtual resources for the VMs while the physical storage administrator manages and maintains the physical storage entities which are transparent to the VI administrator and to the overlying VMs.

Figure 2:
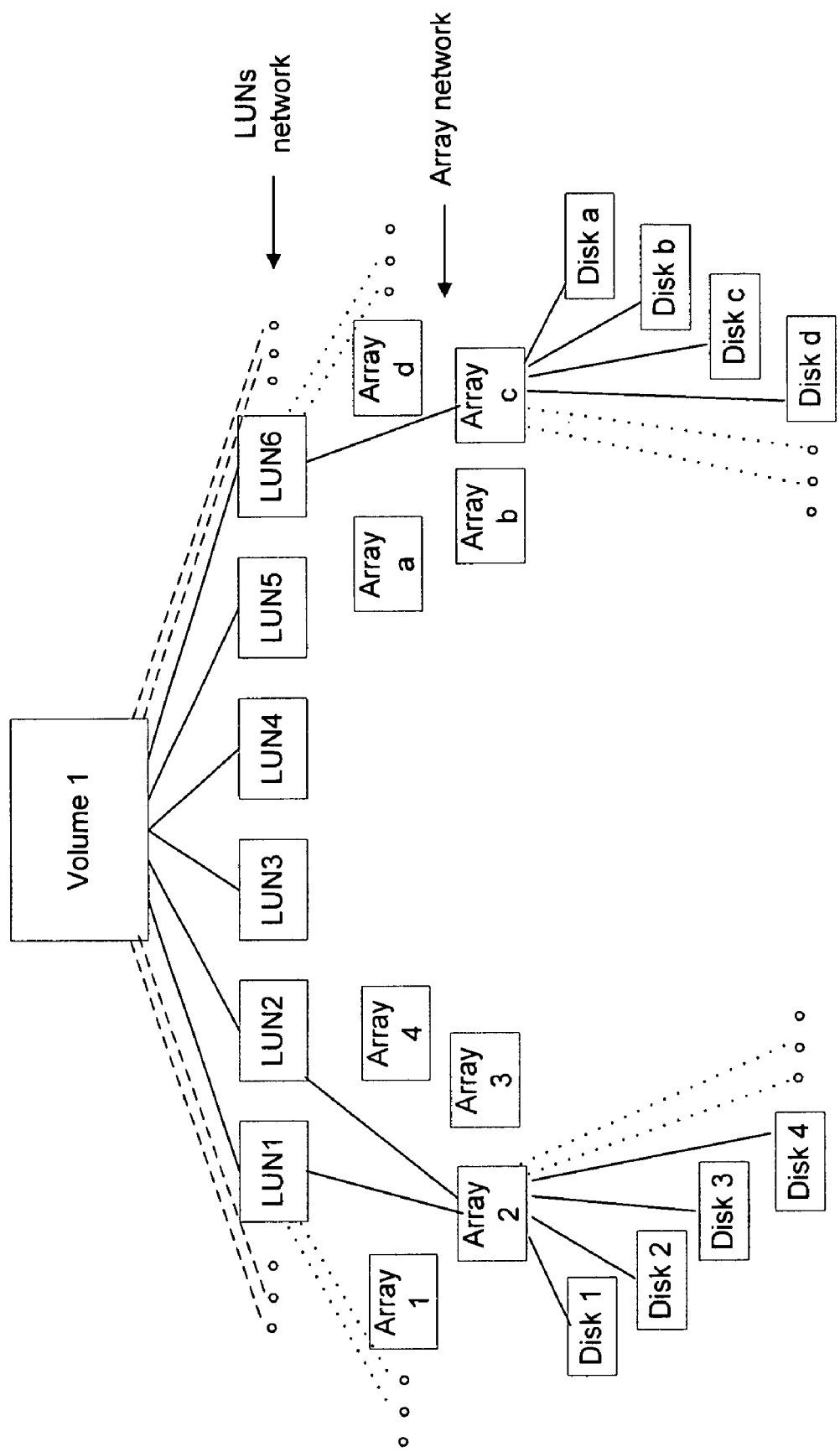
FIG. 2 illustrates an overview of a physical data storage tree with different types of physical storage entities and their interrelationship, in accordance with one embodiment of the present invention.

FIG. 2 illustrates a simplified schematic representation of a data hierarchy that is used in providing storage to the VMs, in one embodiment of the invention. In one embodiment, physical storage entities are distributed in a hierarchical manner and are represented using a data storage tree. At the top of data storage tree is a volume. The volume is generated internally by an abstraction algorithm during a creation of a virtual datastore and is a logical representation of one or more physical storage entities. The one or more physical storage entities are associated with one or more capabilities and specific quota. In one embodiment, each volume includes one or more physical logical unit numbers (LUNs), each LUN is mapped to one array of a array network and each array is a combination of one or more disks. In one embodiment, an array in the array network may be mapped to more than one LUNs in a LUN network. The volume can include one or more LUNs, one or more arrays, one or more disks or any combination thereof. When an abstraction algorithm needs to provision storage for a VM, the abstraction algorithm analyzes the storage requirements of the VM, traverses through the different hierarchical levels of a data storage tree and selects one or more of the physical storage entities that match the capability and quota requirements of the VM. The identified physical storage entities are then used to generate a virtual datastore. During the creation of a virtual datastore, the abstraction algorithm creates a volume internally that is a logical representation of the underlying identified one or more physical storage entities. A virtual datastore identifier in the form of a universal unique identifier (uuid) is created for the virtual datastore (VDS) that is independent of any of the volumes identifiers and uniquely identifies the VDS. The virtual datastore is then assigned to the VM which references the underlying physical storage entities using the unique virtual datastore identifier.

Figure 3:
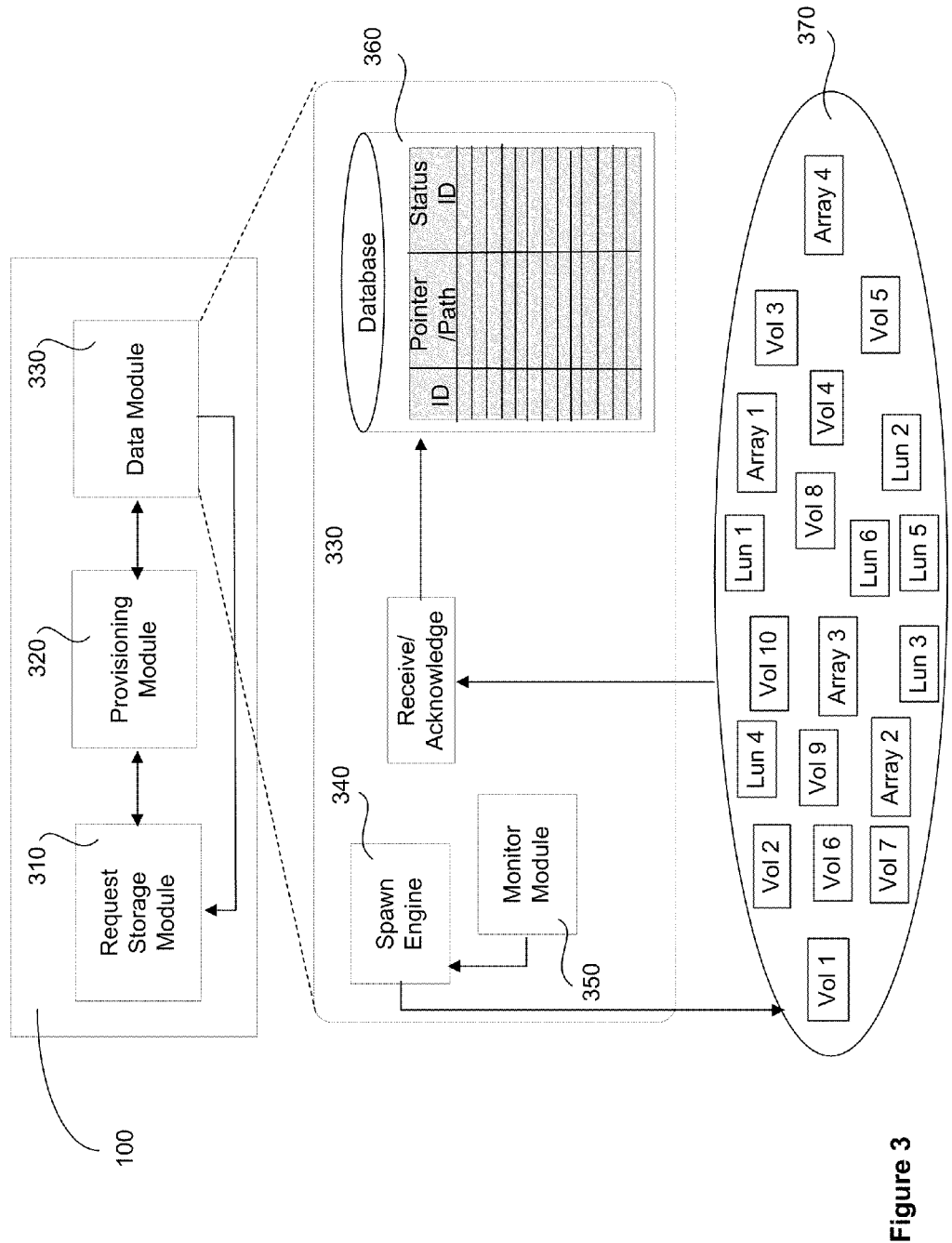
FIG. 3 illustrates an overview of various components of an abstraction layer of a system used in storage virtualization, in accordance with one embodiment of the present invention.

FIG. 3 illustrates a simplified schematic representation of the various modules of an abstraction algorithm running on a server that are involved in the virtualization of storage, in one embodiment of the invention. The abstraction algorithm includes a request storage module 310 to receive a request for storage from a virtual machine. The request can be obtained during creation of a virtual machine (VM) on a host or while moving the VM from one host to another. During the creation of the VM, for instance, the abstraction algorithm 100 will analyze the requirements of storage that the VM needs in order to run applications on the host. Based on the analysis, the abstraction algorithm 100 will generate a request at the request storage module 310. The request includes capability and quota requirements for storage required by the VM in order to run applications. The request is analyzed and validated to ensure that the request is a valid request and from a valid VM. The request is then forwarded to a provisioning module 320.

The provisioning module 320 includes programming logic to define the request and set the parameters of the request. A mapper module (not shown) available to the provisioning module 320 determines the type of request and queries a data module 330 to identify physical storage entities that satisfy the requirements of the VM. The data module may include a database 360 that includes details of all physical storage entities that are available, along with associated capability and quota. The entries in the database 360 may include, at a minimum, distinct identifiers to uniquely identify the physical storage entities, a status of each of the storage entities and a pointer/path to the actual physical storage.

The information at the database 360 is kept current by constantly polling the underlying physical storage entities. The data module 330 interacts with the actual physical storage entities and obtains the status and other relevant information and updates the database 360 accordingly. To assist the data module 330 in obtaining updated information of the underlying physical storage entities, a spawn engine 340 is provided. The spawn engine 340 spawns the process to get the status of the physical storage entities by traversing a physical storage farm 370 to obtain the current information on the storage entities. This may entail obtaining information associated with any additions, deletions, failures, resignatures, and relocation of physical storage entities. The physical storage farm 370 may be in the form of a storage tree with the physical storage entities distributed along the tree in a defined hierarchy. In one embodiment, the storage tree includes volumes, logical unit numbers (LUNs), arrays, disks, etc., as illustrated in FIG. 2. In addition to the aforementioned physical storage entities, the storage farm 370 may also include other physical entities that can provide the capability and quota requirements that satisfy the request of a VM. The spawning can be done periodically or sporadically on-demand. A monitor module 350 within the data module 330 provides a trigger mechanism that triggers the spawn engine 340 to spawn the process for each of the underlying storage farm to obtain the status and other information associated with the storage entities. The trigger mechanism may use a pre-defined logic for triggering the spawn engine. The information obtained from spawning is received through a receive/acknowledge module within the data module 330 and updated to the database 360 at the data module 330.

Figure 4:
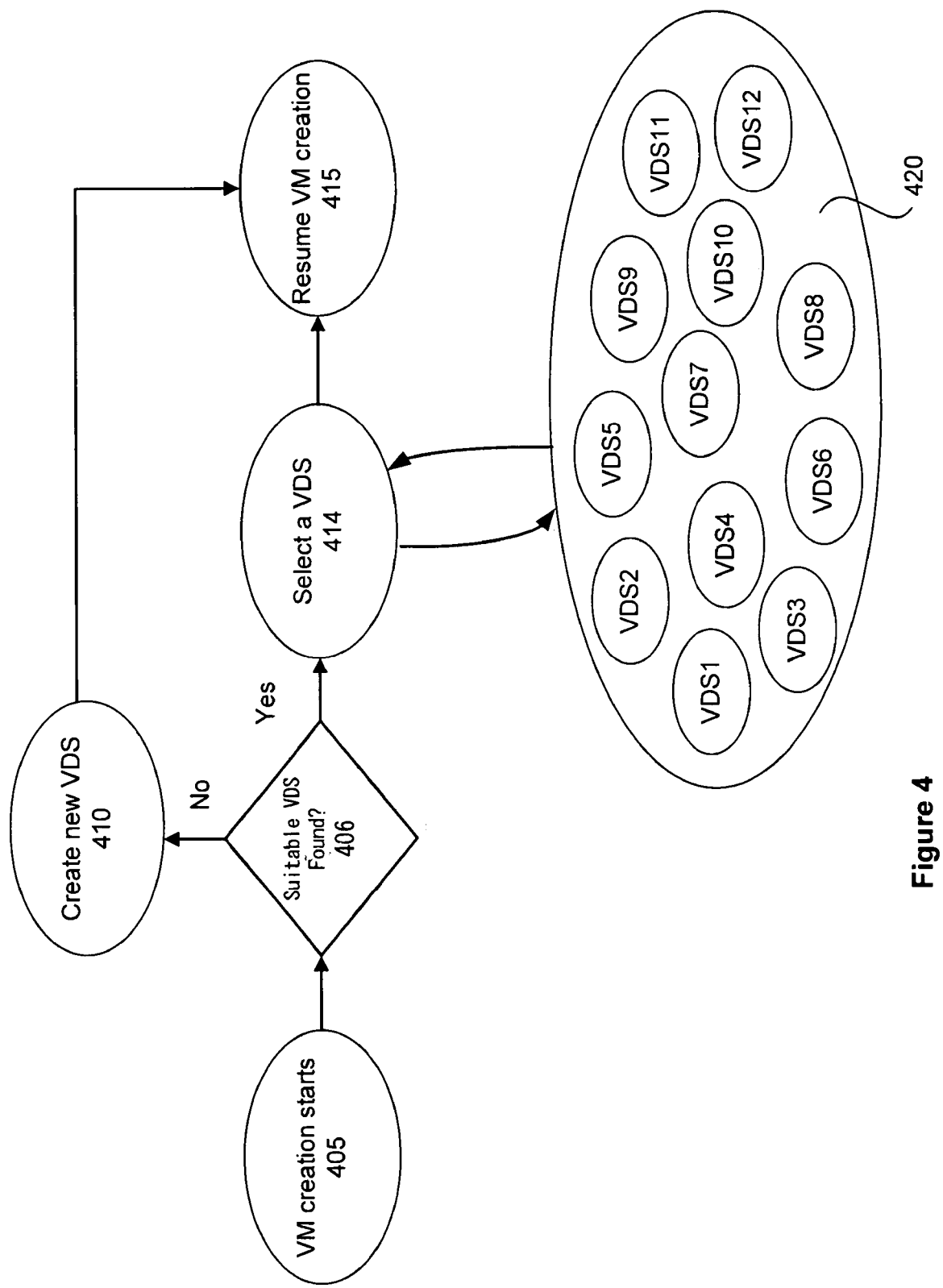
FIG. 4 illustrates a proposed sequence of steps in using a virtual datastore during virtual machine provisioning, in one embodiment of the invention.

FIG. 4 illustrates an alternate embodiment defining proposed sequence of steps for provisioning a virtual datastore for a virtual machine. In the embodiment illustrated in FIG. 4, a request to create a virtual machine is received at a host server and the process of provisioning the virtual machine begins, as illustrated in operation 405. As the VM is being created, an abstraction algorithm analyzes the request for provisioning the VM to determine the storage requirements that the VM will need in order to execute applications. The virtualization algorithm may then run a discovery algorithm to determine if any virtual datastore is available to satisfy the VM's storage requirements. At decision step 406, the virtualization algorithm attempts to find, based on the quota and/or capacity, a suitable VDS from database 360 (FIG. 3). When no suitable VDS is currently available to satisfy the VM's storage requirements, the creation of the VM is suspended and the abstraction algorithm starts a new VDS creation process, as illustrated in operation 410.

The abstraction algorithm first analyzes the request to determine the capability and quota requirements of storage required by the VM and spawns an underlying physical storage farm to identify one or more physical storage entities that satisfy the VM's storage requirements. A volume is generated with the identified physical storage entities and a unique volume identifier is provided to identify the volume. Additionally, the abstraction algorithm creates a virtual datastore for the volume and provides a unique virtual datastore identifier in the form of a universal unique identifier (uuid) that is independent of any of the volumes' or physical storage entities' identifiers. The volume and underlying physical storage entities associated with the volume are mapped to the virtual datastore using the unique virtual datastore identifier. Upon creation of the virtual datastore (VDS), the VM creation resumes, as illustrated in operation 415. The newly generated VDS will be provisioned to the newly created VM so that the VM may be able to run applications using the VDS on a host machine to which the VM is mapped. If one or more VDSs are found, at step 414, a suitable VDS is selected and the VM creation resumes, as illustrated at step 415.

During the creation of the VM, an abstraction algorithm identifies the capability and quota requirements of the VM and then uses an abstraction algorithm to determine if any virtual datastore (VDS) exists within the system that satisfies the capability and quota requirements of the storage requirements of the VM. The discovery algorithm at step 414 may scout a VDS farm 420 to determine if any of the existing VDS satisfies the capability and quota requirements associated with the storage request of the VM. The VDS farm 420 is a repository of all VDSs that are available to the host or cluster where the VM is being provisioned. In one embodiment, the VDS farm 420 is in the form of a database that was described earlier with reference to FIG. 3. When a VDS with the capability and quota to satisfy the VM's requirements is identified, the abstraction algorithm verifies the status of the VDS to ensure that the VDS is available for provisioning. Upon successful verification, the identified VDS is provisioned to the VM and the VM creation process continues.

The provisioned VDS preserves the virtual infrastructure of the virtual machine. This entails enabling references to the physical storage while providing the ability to change the physical storage without breaking the virtual infrastructure. This is made possible by separating the physical data access from logical data access and allowing references to the physical data using VDS's unique virtual datastore identifier. Even when the physical storage entities change due to addition, deletion, failure, relocation, etc., the VDS maintains the mapping with the VM thereby preserving the virtual infrastructure while the newly changed physical storage entities are re-linked/remapped to the VDS. This allows the physical storage administrator to do routine maintenance and management of the physical storage without affecting the virtual infrastructure and the virtual infrastructure administrator can manage the changes at the virtualization level without adversely affecting the physical storage entities. Further, by disengaging the tightly coupled physical layer to the virtual layer using a separate virtual datastore identifier and enforcing policy management, efficient vendor-independent and file-system independent storage management is accomplished. The VDS can include volumes and other physical storage entities. Capacities and capabilities can be added to the VDS to define the properties in a vendor agnostic and file system agnostic manner.

Figure 5:
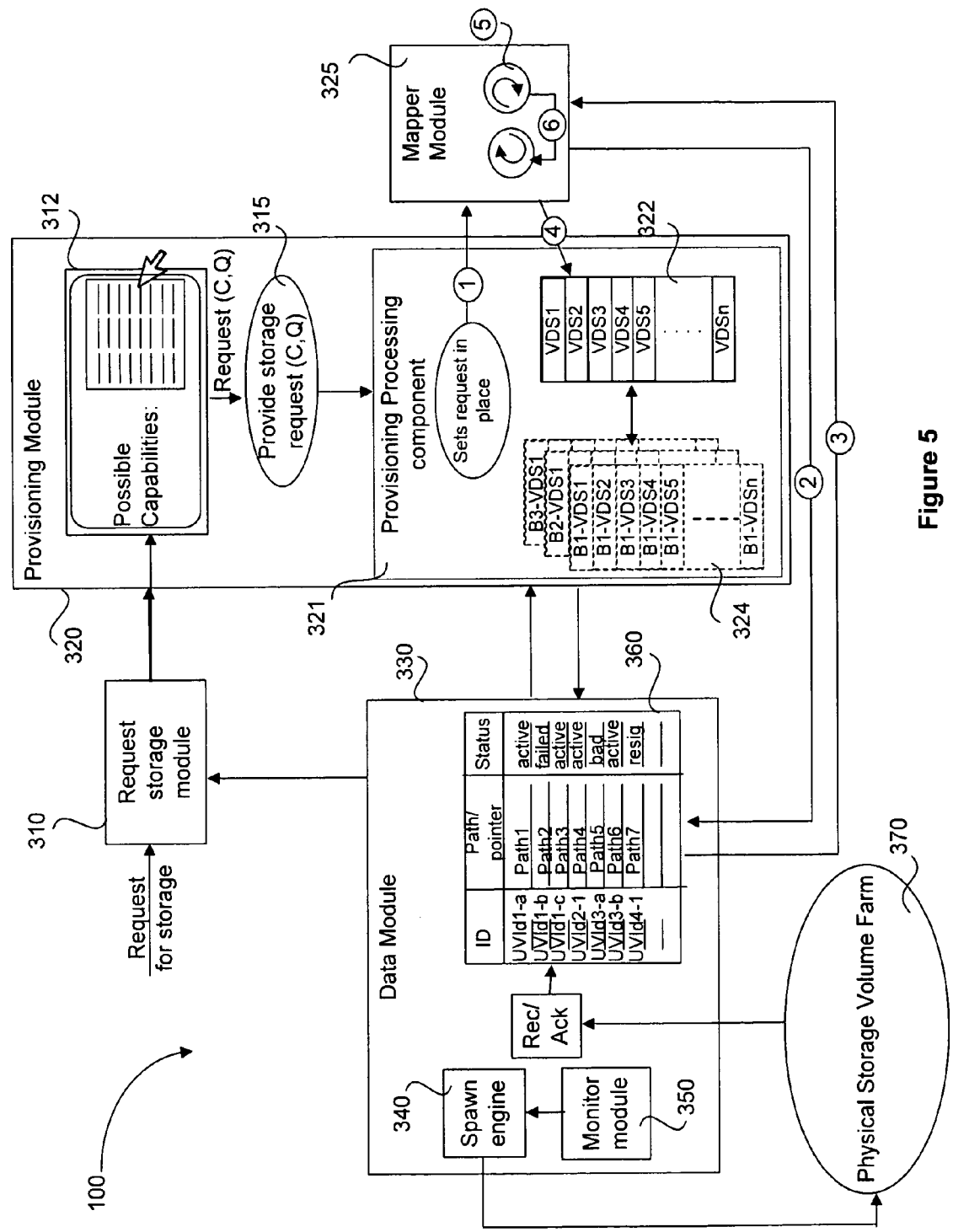
FIG. 5 illustrates a proposed sequence of steps, for generating and maintaining a virtual datastore, in accordance with one embodiment of the present invention.

FIG. 5 illustrates an overview of a process flow using various components of an abstraction algorithm that is run on a server system, such as a host, during provisioning of storage for a virtual machine. As illustrated, the process begins with a request for storage obtained from a virtual machine (VM) for running applications on a host. The request is received at a request storage module 310 during the creation of the VM or when the VM is being relocated to another host. The request storage module 310 verifies the request to ensure that the request is a valid request from a valid VM. The request is then forwarded to a processing module 320 to analyze the request and to determine requirements for storage desired by the VM including any quota requirements. The storage requirements may include a set of capabilities that are expressed as a plurality of attributes. Some of the attributes defining the capabilities may include data duplication, frequency of data backup, data type, vendor type, size, etc. In one embodiment, upon analysis, the processing module 320 may provide a user interface 312 for rendering a list of possible capabilities that may be available at the physical storage level. In one embodiment, the list may be generated based on the type of requests received in the past and by the type of underlying physical storage entities available to the system. In another embodiment, the set of capabilities are explicitly defined at the user interface 312 or is provided through a menu driven option available at the user interface 312. One or more capabilities are obtained at the request storage module 310 either through selection or explicit specification that defines the storage requirements of the VM. The request with at least the capabilities and quota are forwarded to a provisioning processing component 321 within the provisioning module 320.

The provisioning processing component 321 receives the request, validates and sets one or more parameters for the request in place. The provisioning processing component 321 then maps the request to a virtual datastore (VDS) that can satisfy the requirements of the request. In order to map the request to a VDS the provisioning processing component 321 uses a mapper module (mapper) 325. The mapper 325 may be distinct or may be integrated with the provisioning processing component 321 of the processing module 320 and includes an algorithm to identify a VDS for the request. The storage request capabilities and quota requirements are forwarded by the provisioning processing component 321 and is received at the mapper 325, as illustrated by bubble 1. The mapper 325 takes the request and queries a data module 330 to determine if any physical storage entities can satisfy the capability and quota requirements of the request, as illustrated by bubble 2.

As mentioned earlier, the data module includes a spawning algorithm to query the underlying physical storage volume farm 370 to obtain the status, capacity or quota, capability and other relevant information associated with the physical storage entities available therein and updates a database 360 at the data module 330. In one embodiment, the term "capabilities" corresponds to features such as replication, thin provisioning, high availability, etc. These capabilities can be obtained from physical entities or storage services. A monitor module 350 available at the data module 330 includes a trigger mechanism that provides a trigger to the spawn engine 340 so that the spawn engine 340 can spawn the process to get current information of underlying physical storage entities. The current information may include information associated with any changes, such as quota or capacity, capability or capabilities, status, etc., to one or more storage entities. The triggering may occur periodically based on a pre-defined logic that is available at the monitor module 350 or sporadically, upon demand. The current information on the storage entities is received at a Receive/Acknowledge module in response to the spawning and is used to update the database 360. The Receive/Acknowledge module is a logic available within the data module 330 to receive information from physical storage volume farm 370 in response to a query from the spawn engine 340 and to acknowledge receipt of the information back to the storage farm 370. Upon receipt of the information the receive/acknowledge module updates the database 360 with the information so that the information in the database 360 stays current.

The updated database 360 provides the necessary information to the mapper 325 when the mapper 325 queries the database in response to the request. As can be seen, the database 360 includes unique identifiers for each volume and for each physical storage entity within the volume. A volume 1 with a unique volume identifier UVId1 may include a plurality of physical storage entities and are represented by unique physical storage entity identifiers, UVId1-$a$, UVId1-$b$, UVId1-$c$, etc. Each entry in the database 360 corresponding to the unique volume and physical storage entity identifiers includes the corresponding unique path that points to the physical storage entity location. A status is also provided for each of the physical storage entities. As can be seen, some of the statuses may include active, failed, resig for resignatured volume or physical storage entity, etc. The statuses are updated dynamically using the spawn engine and receive/acknowledge logic module. As and when the statuses change, the corresponding updates are returned by the data module to the mapper module 325 so that the virtual datastore database 322 can be updated accordingly.

In one embodiment, upon receiving the request from the mapper 325, the data module 330 searches the database 360 with current information on the physical storage entities available to the system to identify one or more physical storage entities that satisfy the capability and quota requirements of the storage request. The data module 330 returns information associated with the identified physical storage entities to the mapper 325 as illustrated by bubble 3. The mapper 325 consolidates the information from all the physical storage entities and generates a logical volume with a unique volume identifier. The logical volume is abstracted into a virtual datastore and a unique virtual datastore identifier is created for the virtual datastore which is independent of the volume identifier of the volume contained therein. The physical storage entities and the corresponding volume are mapped to the virtual datastore through the virtual datastore identifier. As noted earlier, the virtual datastore may be mapped to a single volume or a plurality of volumes. Moreover, a single volume may be associated with two or more virtual datastores.

The VDS, in turn, is provisioned to the VM in response to the initial storage request. It should be noted that the link established between the VM and the virtual datastore using the unique virtual datastore identifier is retained so long as the VM is mapped to the virtual datastore irrespective of any change made to any content that is assigned to the VDS or to the underlying physical storage entities and it should be understood that the administrators of physical storage can change, update, remove, add any type of storage elements retaining the link.

Further, the VDS is updated to a virtual datastore database 322 maintained at the provisioning processing component 321 of the provisioning module 320, as shown by bubble 4. The virtual datastore database 322 is a repository of virtual datastores with VDS information associated with the virtual datastores that are currently mapped to any virtual machine available at the system. The provisioning processing component 321 may periodically backup 324 the VDSs available at the VDS database 322. The backup virtual datastore may be maintained either locally or remotely. The provisioning processing component 321 may provide a single backing or may provide multiple backings 224 of the VDSs in the VDS database 222. The one or more backings 224 of a VDS may be used in place of the VDS when a VDS is unavailable or when the VDS needs to be relocated. In one embodiment, the backup VDS can be used to provide high-availability for VDS itself. A VDS can be made highly-available to provide high-availability for virtual machines that use this VDS. In one embodiment, to make a VDS highly-available, a backup VDS (B-VDS) is created which will have same identifier as the original VDS but may have property indicating that it is a backup VDS. A backup VDS could be created using the hardware capabilities of storage devices or storage services. A backup VDS provides a copy of the VDS data. If the primary VDS goes offline due to any reason, the backup VDS provides a secondary copy of the data and thus providing high availability for virtual machines and their storage. The backup VDS may be maintained locally or remotely. In one embodiment, a B-VDS is used to implement disaster recovery feature in which the secondary site uses the B-VDS to register the recoverable virtual machines without having to change the virtual machine references to underlying storage.

In another embodiment, a VDS may already be defined that satisfies the request requirements of a VM. In this embodiment, the provisioning processing component 321 within the provisioning module 320 will query the VDS database 322 to identify the VDS and the mapper 325 will determine the status of the identified VDS including the underlying physical storage entities to determine if the VDS is available for provisioning. Upon successful verification, the identified VDS is mapped to the VM.

In addition to creating a VDS for the virtual machine, the mapper 325 maintains the quality of service by constantly monitoring the information associated with a VDS. The mapper 325 frequently polls the data module 330 to obtain information associated with each virtual datastore from the database 360 at the data module 330. The information gathered by the mapper 325 is compared against the information at the VDS database 322 to ensure that the information is still valid, as illustrated by bubble 5. If no change is detected, then the mapper 325 just validates the information at the VDS database 322. However, if any change is detected at the data module 330 for a particular VDS, information related to the change is updated to the VDS database 322, as shown by bubble 6. The VDS still retains the virtual datastore identifier even when changes occur at the volumes that are mapped to the VDS. The change may include relocation, addition, failure, or deletion of one or more physical storage entities and/or quota or capability changes. A policy engine (not shown) available at the mapper 325 ensures that the quality of service (QoS) associated with the virtual storage is maintained by enforcing one or more policies during provisioning and monitoring. For instance, a plurality of physical storage entities A, B and C may be used together to define a volume, V1. Similarly, physical storage entities D, E, F, and G may be used to define volume V2. If after generating a virtual datastore VDS1, one of the storage entities, say A, in volume V1 was retired. The spawn engine would detect the change and a new storage entity, A', that matches or exceeds the capability and quota requirements of storage entity A is identified. A new volume V1' is defined with A', B and C storage entities and the new volume V1' is mapped to the same virtual datastore identifier of the virtual datastore. The mapper 325, in turn, detects the change in the volume V1 and updates the VDS1 entry in the VDS database 322 by removing reference to V1 and replacing with a mapping of V1' instead. Any reference to VDS1 provisioned at the virtual machine is transparent to these changes as the changes occur at the physical level and not at the virtualization level. This is due to the fact that the storage is mapped to the physical entities through the virtual datastore identifier that is independent of the volume identifier and the identifiers associated with the underlying physical storage entities. Thus, by maintaining physical entities separate from virtual entities, changes can be easily accommodated at the physical storage level without affecting the virtual entities. Additionally, the changes at the physical level are handled by the physical storage administrator without the VI administrator knowledge while the VI is preserved.

In one embodiment, upon detecting a change to a volume, such as retirement of volume V1, the mapper 325 detects the change and queries the data module 330 to determine if the capability and quota requirements of the request are being met and whether the quality of service is maintained. If the capability and quota requirements are still maintained, the mapper 325 will not change the VDS to reflect the change. If, however, the quality of service is compromised (due to the capability and/or quota not being met for the request) then the mapper 325 will query the data module 330 to identify one or more physical storage entities that match the capability and quota requirements. A new volume is generated and is mapped to the same VDS in which the change was detected using the corresponding unique virtual datastore identifier so that the VDS preserves the quality of service and thus, the integrity of the virtual infrastructure.

Figure 6:
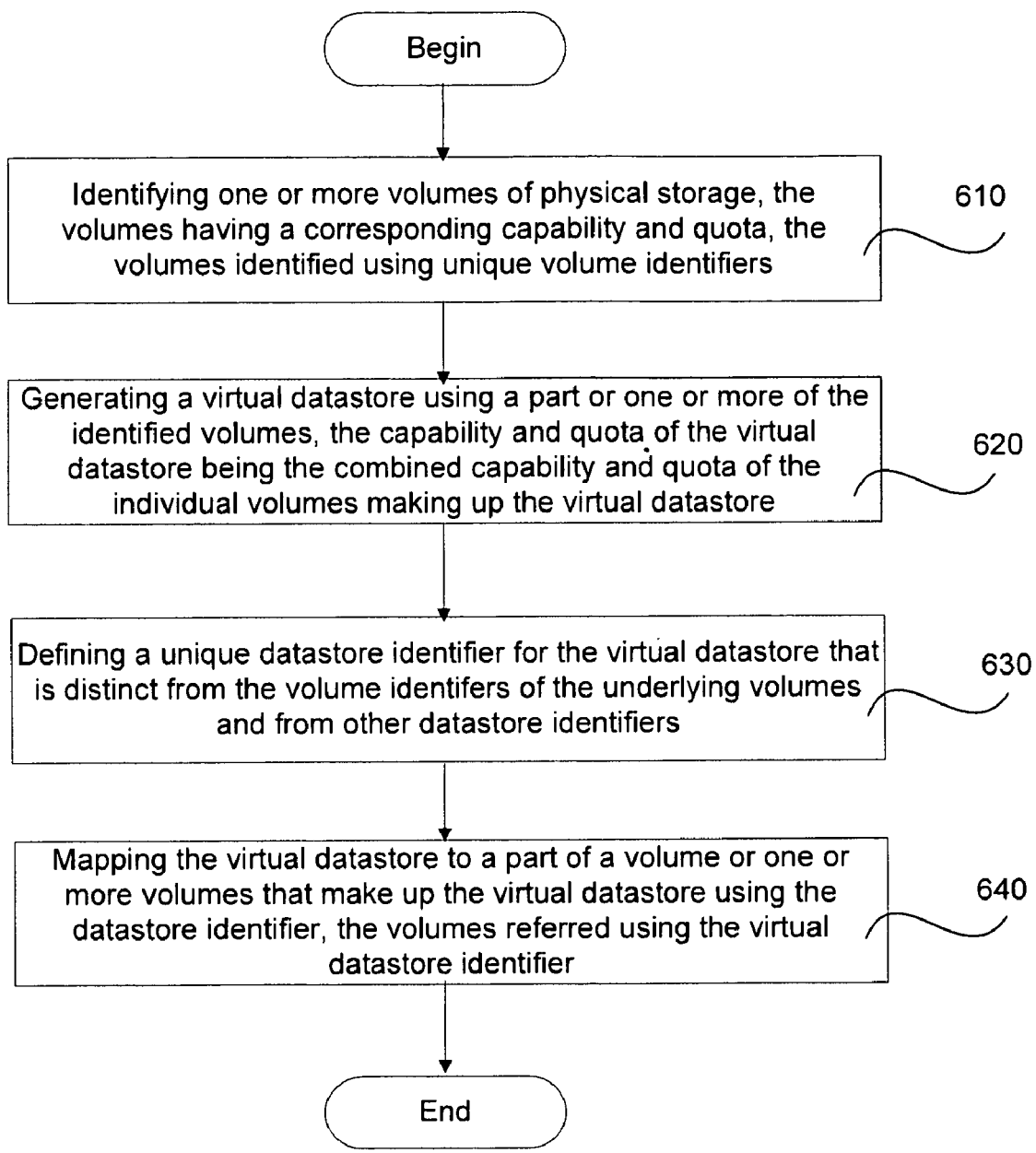
FIG. 6 illustrates a flow chart of operations for virtualizing a physical storage, in accordance with one embodiment of the invention.

FIG. 6 illustrates process flow operations involved in generating a virtual datastore provides storage virtualization to physical storage, in one embodiment of the invention. In this embodiment, a virtual datastore is created and associated with a virtual machine based on storage request initiated for the VM. The process begins at operation 610 wherein one or more volumes are identified. Each of the volumes includes one or more physical storage entities and have a unique volume identifier and a defined set of capabilities and quota. A virtual datastore is generated using the identified volume, as illustrated in operation 620. The VDS includes the combined capability and quota of the underlying physical storage entities of the volumes that make up the VDS. A distinct virtual datastore identifier that is different from any of the volume identifier is created to uniquely identify the virtual datastore, as illustrated in operation 630. The one or more volumes are mapped to the virtual datastore using the virtual datastore identifier, as illustrated in operation 640. The virtual datastore retains the unique virtual datastore identifier even when changes are made to the one or more volumes mapped to the virtual datastore. The unique virtual datastore identifier is used to reference the physical storage entities thereby providing the virtualization of the storage entities.

Figure 7:
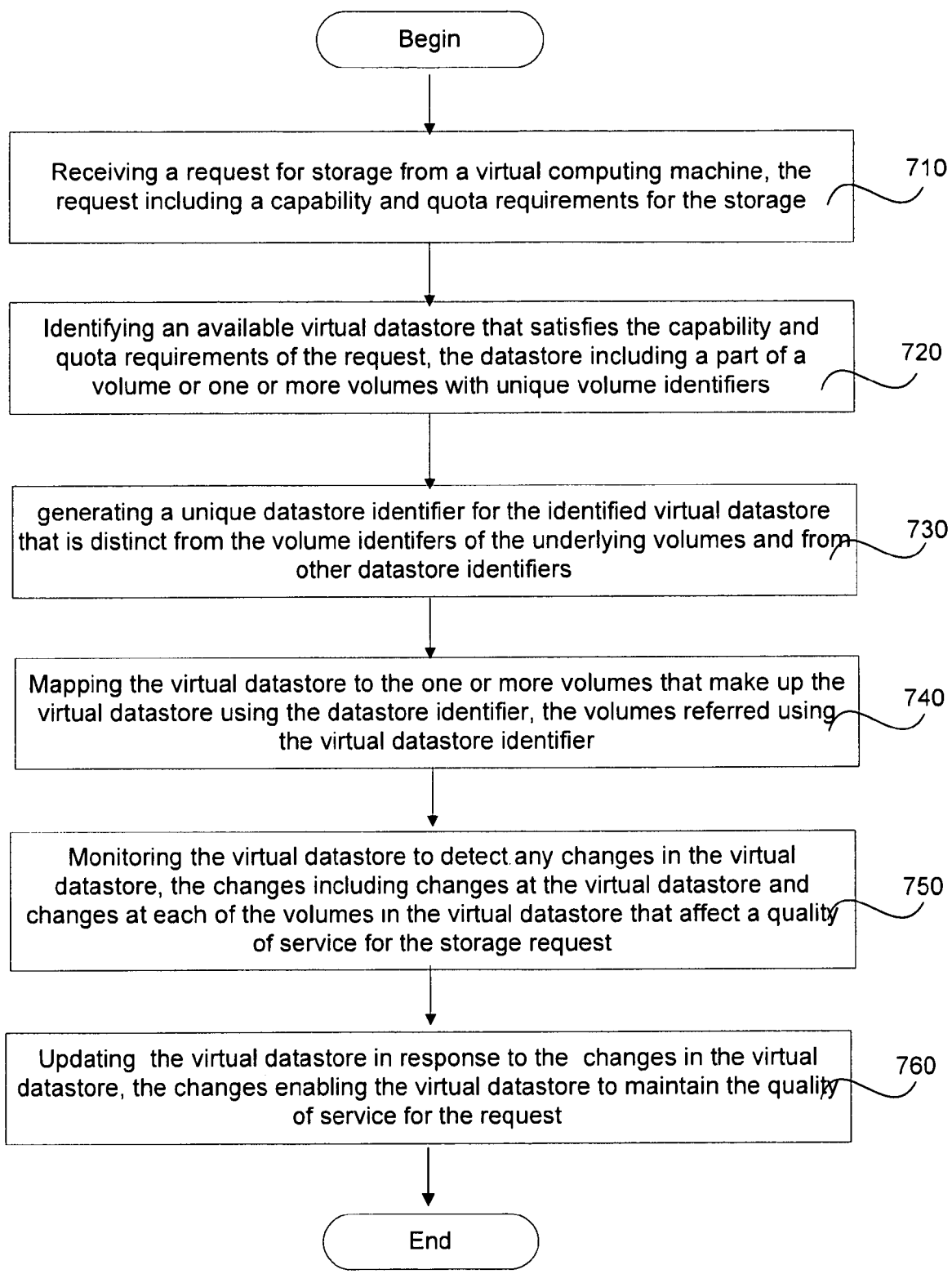
FIG. 7 illustrates a flow chart of operations for generating and maintaining a virtual datastore, in accordance with an alternate embodiment of the invention.

FIG. 7 illustrates process flow diagram identifying process operations involved in providing storage virtualization using a virtual datastore, in an alternate embodiment of the invention. The process begins at operation 710 where a request for storage is received from a virtual machine. The request may be received during the provision of a virtual machine (VM) or during a transfer of a VM from one host to another. The request is first validated to ensure that the request is from a valid VM and includes valid request. The request is then analyzed to determine the storage requirements of the VM, such as a set of capabilities and quota requirements. A virtual datastore with the associated capabilities and quota that satisfy the requirements of the request is identified, as illustrated in operation 720. A distinct virtual datastore identifier that is different from any of the volume identifiers is generated, as illustrated in operation 730. The physical storage entities are mapped to the virtual datastore using virtual datastore identifier so that the physical storage entities can be referenced using the datastore identifier, as illustrated in operation 740.

The physical storage entities are continuously monitored to determine if there are any changes that may affect a quality of service of the storage for the VM, as illustrated in operation 750. The quality of service may be affected if any of the underlying physical storage entities fail or are relocated or are modified. As and when the change is detected, the virtual datastore is updated accordingly while still retaining the virtual datastore identifier for the virtual datastore, as illustrated in operation 760. The change can be as simple as addition of a storage entity or deletion of a storage entity, etc. Such changes affect the quality of service provided by the storage since one or more capabilities or quota may not be met. The resulting datastore exhibits the combined capability and quota requirements of the individual storage entities and satisfies the VM's storage requirements. The VDS provides the virtualization that enables the physical storage entities to be referenced while providing the ability to perform routine maintenance and management of the physical storage entities independent of the virtual datastore. Thus, the virtual datastore provides the virtualization that enables clear delineation of the physical storage administrator's role from the virtual infrastructure administrator's role. Additionally, with the use of the virtual datastore, storage capacity is not restricted to the capacity limitation of any single physical storage entity but can be expandable enabling storage pool behavior. With the use of a policy engine to enforce a policy, quality of service is maintained, making this a more robust, easy, and straightforward tool. Thus, the abstraction algorithm provides a tool that enables true storage virtualization using virtual datastore.

The benefits of providing storage virtualization include non-disruptive data migration, better utilization of pooling storage, replacing backings as needed, quality of service by enabling vendor-agnostic capabilities and storage policy management. Virtual datastores then become a cloud of storage resources differentiated by their quality of service. Management of storage by the underlying layers can be done without affecting the virtual infrastructure management layer. A lot of data migration work can be offloaded to corresponding vendors associated with the physical storage entities leading to better performance.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments of the present invention can also be defined as a machine that transforms data from one state to another state. The transformed data can be saved to storage and then manipulated by a processor. The processor thus transforms the data from one thing to another. Still further, the methods can be processed by one or more machines or processors that can be connected over a network. The machines can also be virtualized to provide physical access to storage and processing power to one or more users, servers, or clients. Thus, the virtualized system should be considered a machine that can operate as one or more general purpose machines or be configured as a special purpose machine. Each machine, or virtual representation of a machine, can transform data from one state or thing to another, and can also process data, save data to storage, display the result, or communicate the result to another machine.

The invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A computer-implemented method for providing storage virtualization of physical storage, comprising:

receiving a request to allocate a storage volume for a virtual machine (VM) running on a host computer, wherein the request comprises a specified storage capacity;

identifying one or more volumes of storage provided by one or more physical storage systems, wherein each of the volumes is accessed by providing a unique identifier to the physical storage system that provides the volume and wherein an aggregate amount of storage provided by the one or more volumes satisfies the specified storage capacity in the request;

generating a mapping of the unique identifiers of the one or more volumes provided by the one or more physical storage systems to a storage volume identifier that is distinct from any of the unique identifiers of the one or more volumes provided by the one or more physical storage systems;

providing the storage volume identifier of the storage volume allocated in response to the request, the storage volume identifier being used by the virtual machine to access the allocated storage volume but not used by the one or more physical storage systems;

monitoring at least one of the underlying one or more physical storage systems and the virtual machine to detect a change that affects the mapping; and updating the mapping to reflect the change while retaining the storage volume identifier for the storage volume of the virtual machine.

2. The method of claim 1, wherein identifying a volume further includes, generating a volume when no volumes are defined or when additional volumes are needed, the volume defined using a unique volume identifier; and defining one or more capabilities for the volume.

3. The method of claim 2, wherein generating a volume further includes, discovering one or more physical storage entities, the storage entities includes at least one of local disks, one or more volumes, LUNs, arrays, or disks wherein each volume is made of one or more LUNs or local disks, each LUN is made up of one or more disks which belong to an array.

4. The method of claim 1, wherein the monitoring and updating is dynamic.

5. The method of claim 4, wherein the monitoring is performed periodically or sporadically on demand.

6. The method of claim 4, wherein monitoring further includes, obtaining status of each of one or more physical storage entities that make up the one or more volumes, the status of each of the physical storage entities determining the availability of the physical storage entities for storage.

7. The method of claim 1, further includes backing the storage volume into one or more backup storage volume, the backup storage volume having an identical storage volume identifier, the backup storage volume exhibiting same quality of service as the storage volume, the quality of service defined by at least the capability and quota of the backup storage volume.

8. The method of claim 1 further comprising:

providing the mapping to the host computer, which uses the mapping to communicate a storage read or write operation to or from the virtual machine in terms of the storage volume identifier, and to communicate the storage read or write operation to or from the one or more physical storage systems in terms of the unique identifier or identifiers, as indicated by the storage read or write operation and the mapping, of the one or more volumes provided by the one or more physical storage systems.

9. A computer-implemented method for providing storage virtualization of physical storage, comprising:

receiving a request for storage from a virtual machine on a host system, the request including a capability and a quota requirement for storage;

identifying a datastore that satisfies the capability and quota requirements of the request, the datastore including one or more volumes with unique volume identifiers which are exposed by one or more storage systems, wherein each volume is accessed by providing its unique identifier to the storage system that provides the volume and wherein each volume includes one or more physical storage entities, the datastore having a unique datastore identifier that is different from any of the unique volume identifiers;

providing a mapping that maps each of the one or more volumes to the datastore to establish a relationship while retaining the datastore identifier for the datastore, the datastore identifier being used by the virtual machine to access the datastore but is not used by the one or more storage systems;

monitoring at least one of the one or more storage systems and the virtual machine to detect a change that affects the mapping; and updating the mapping to reflect the change, the updated datastore of the virtual machine retaining the datastore identifier.

10. The method of claim 9, wherein receiving a request further includes, presenting a plurality of capabilities and quota available for the request; and obtaining selected one or more capabilities and a quota for the request, the selected capabilities and quota defining the storage requirements of the virtual machine.

11. The method of claim 9, wherein the datastore is identified from a plurality of pre-defined datastore, each of the plurality of pre-defined datastore retaining a corresponding unique datsatore identifier, wherein each of the plurality of pre-defined datastores is of fixed capacity and quota.

12. The method of claim 9, wherein identifying a datastore-further includes defining a datastore when no datastore is available to satisfy the capability and quota requirements of the request, wherein the datastore is created dynamically on-demand.

13. The method of claim 12, wherein defining a datastore further includes,
   traversing a data storage tree to identify one or more physical storage entities, the physical storage entities having an associated quota and capabilities;
   creating one or more volumes with the identified one or more physical storage entities, each of the volumes defined by quota and capabilities of the one or more physical storage entities that make up the volume; and
   generating a datastore with the identified one or more volumes, the datastore satisfying the capability and quota requirements of the request, the datastore having a unique datastore identifier that is different from any of the identifiers associated with the one or more volumes; the one or more volumes mapped to datastore while retaining the datastore identifier for the datastore,
   wherein the physical storage entities include at least one of local disks, one or more volumes, LUNs, arrays, or disks wherein each volume is made of one or more LUNs or local disks, each LUN is made up of one or more disks which belong to an array.

14. The method of claim 12, wherein the generating a datastore includes assigning capabilities to the datastore.

15. The method of claim 9,
   wherein the monitoring and updating is dynamic.

16. The method of claim 15, wherein the monitoring further includes,
   monitoring status of each of the physical storage entities within the one or more volumes of the datastore, the status determining the availability of the corresponding physical storage entities for storage.

17. The method of claim 15, wherein the monitoring is done periodically or on demand.

18. The method of claim 15, wherein the change includes change to any one or more of status, capabilities, quota, and identity while retaining the datastore identifier for the datastore, the change affecting a quality of service associated with the storage.

19. The method of claim 18, wherein when the change includes change to storage capability or quota of a volume in the datastore,
   determining if the change in storage capability or quota of the volume continues to satisfy the storage capability and quota requirements of the request;
   generating a new volume with additional one or more new physical storage entities that satisfies the storage capability requirements of the request when a change in the storage capability or quota of the volume does not satisfy the storage capability or quota requirements of the request; and
   mapping the new volume to the datastore using the same datastore identifier so that the new physical storage entities within the new volume can be referenced by the virtual machine using the datastore identifier,
   wherein the change in storage capability is due to any one or more of volume resignaturing, storage module failure, storage module move or removal of the storage module.

20. The method of claim 9, wherein a link between the virtual machine and the datastore established by the datastore identifier is maintained so long as the virtual machine is mapped to the datastore identifier of the datastore, irrespective of any changes made to the physical storage entities that is associated with the datastore.

21. The method of claim 9 further comprising:
   providing the mapping to the host system, which uses the mapping to communicate a storage read or write operation to or from the virtual machine in terms of the datastore identifier, and to communicate the storage read or write operation to or from the one or more storage systems in terms of the unique identifier or identifiers, as indicated by the storage read or write operation and the mapping, of the one or more volumes provided by the one or more storage systems.

22. A system for providing storage virtualization of physical storage for one or more virtual machines, comprising:
   a server computer, communicatively coupled to one or more hosts capable of supporting one or more virtual machines and communicatively coupled to one or more storage systems comprising one or more physical storage entities, that facilitates storage virtualization for one or more virtual machines by generating and maintaining mappings between one or more datastores and at least some of the storage exposed by the one or more storage systems, the server computer equipped with a plurality of components to service a request for storage of a virtual machine, the plurality of components includes,
   a virtual machine creator with programming logic to create a virtual machine for executing one or more applications on a host, the virtual machine creator generating a request for storage that identifies a set of capabilities and quota requirements for the virtual machine;
   a provisioning module with programming logic to, receive the request for storage; and analyze the request to identify the storage requirements; and
   a mapper module having programming logic to, responsive to not identifying a datastore that satisfies the capabilities and quota
   requirements of the request:
     identifying one or more volumes of storage provided by one or more storage systems, wherein each of the volumes is accessed by providing a unique identifier to the storage system that provides the volume and wherein an aggregate amount of storage provided by the one or more volumes satisfies the capabilities and quota requirements of the request;
     generating a mapping of the unique identifiers of the one or more volumes provided by the one or more storage systems to a datastore identifier that is distinct from any of the unique identifiers of the one or more volumes provided by the one or more storage systems; and
     providing the datasore identifier as an identification of the datastore allocated in response to the request, the datastore identifier being used by the virtual machine to access the allocated one or more volumes but not used by the one or more storage systems; and
   responsive to identifying a datastore that satisfies the capabilities and quota requirements of the request, providing a datastore identifier for the datastore in response to the request, the datastore identifier being mapped by a mapping to unique identifiers of one or more volumes provided by the one or more storage systems wherein each of the volumes is accessed by providing its unique identifier to the storage system that provides the volume, the datastore identifier being distinct from any of the unique identifiers of the one or more volumes provided by the one or more storage systems, and the datastore identifier being used by the virtual machine to access the allocated one or more volumes but not used by the one or more storage systems; and a monitor module that monitors at least one of the one or more storage systems and the virtual machine to detect a change that affects the mapping, wherein the mapping is updated to reflect the change and while retaining the datastore identifier for the datastore of the virtual machine.

23. The system of claim 22, further includes, a data module to store information associated with the various storage systems, wherein the information associated with the physical storage systems include one or more of status, type, capability, quota, path, volume identifier and storage entity identifier of storage provided by the storage systems.

24. The system of claim 22, wherein the monitor module automatically monitors each of the storage systems in order to detect any changes to the storage systems that affect quality of service.

25. The system of claim 24, further includes a policy engine for providing logic that defines quality of service for the storage.

26. The system of claim 22 wherein the server computer further comprises:

providing the mapping to the host, which uses the mapping to communicate a storage read or write operation to or from the virtual machine in terms of the datastore identifier, and to communicate the storage read or write operation to or from the one or more storage systems in terms of the unique identifier or identifiers, as indicated by the storage read or write operation and the mapping, of the one or more volumes provided by the one or more storage systems.

* * * * *